May 29, 1962 — C. CIMINO — 3,036,650
CARRIER WITH DEMOUNTABLE SIDE FRAMES
Filed Aug. 3, 1959 — 3 Sheets-Sheet 1
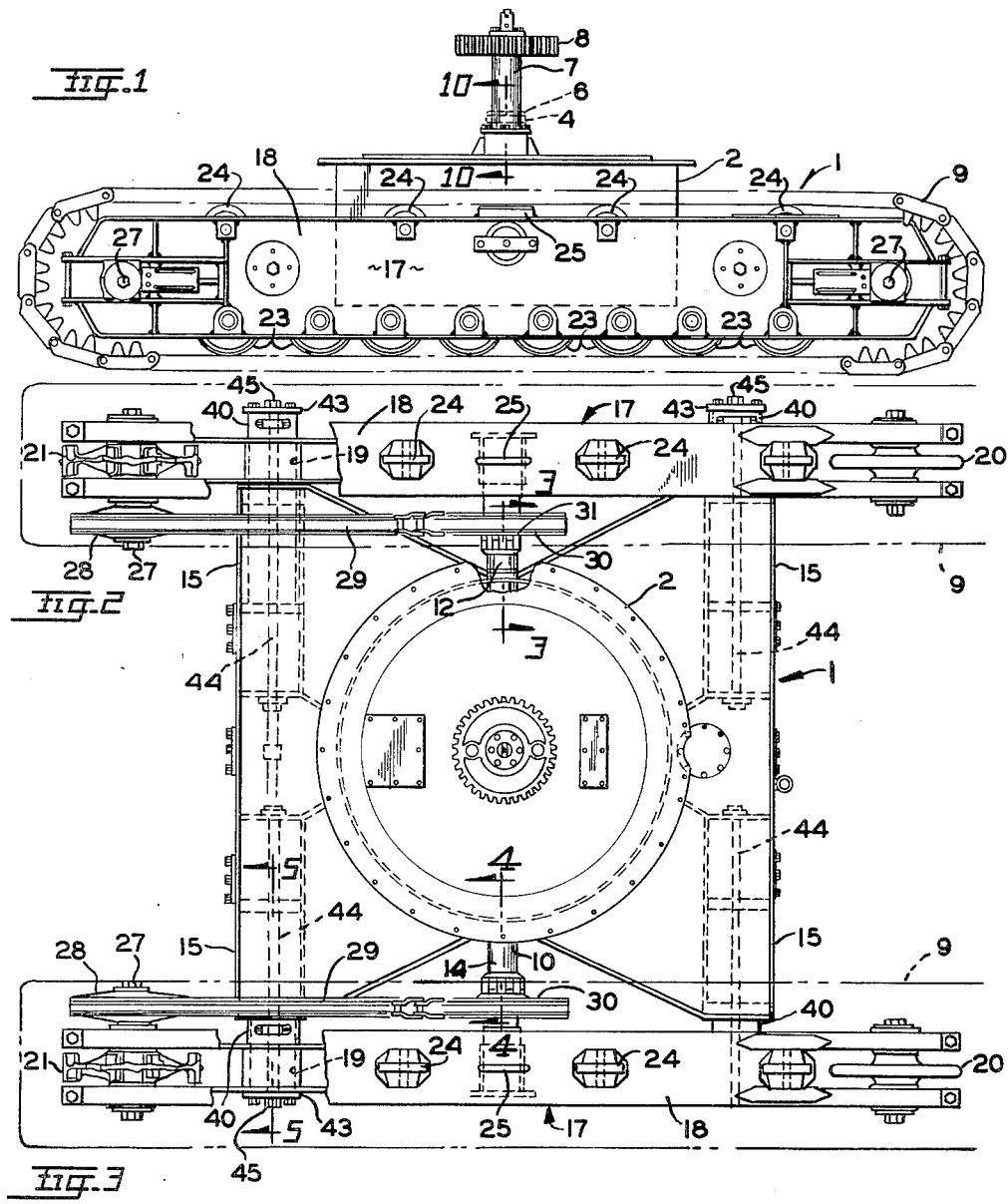
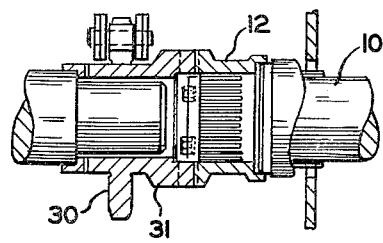
INVENTOR.
CHARLES CIMINO
BY
Oberlin, Maky & Donnelly
ATTORNEYS May 29, 1962    C. CIMINO    3,036,650
CARRIER WITH DEMOUNTABLE SIDE FRAMES
Filed Aug. 3, 1959    3 Sheets-Sheet 2
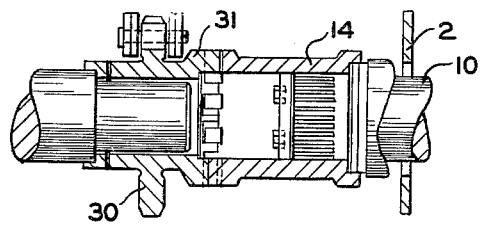
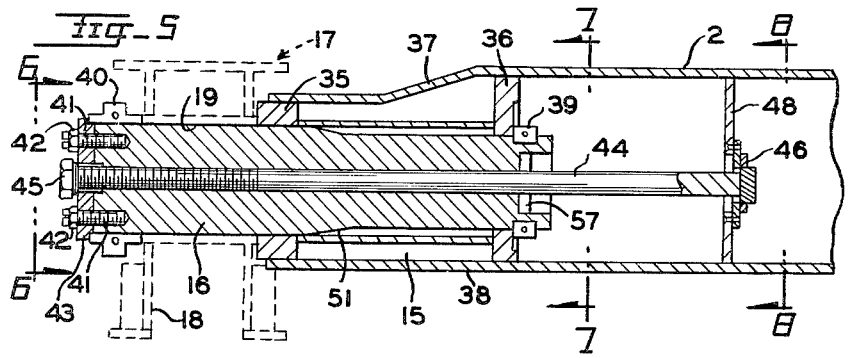
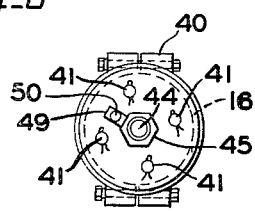
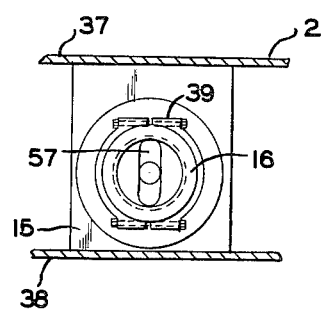
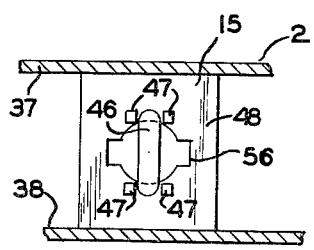
INVENTOR.
CHARLES CIMINO
BY
Oberlin, Maky & Donnelly
ATTORNEYS United States Patent Office 3,036,650
Patented May 29, 1962

3,036,650
CARRIER WITH DEMOUNTABLE SIDE FRAMES
Charles Cimino, Lorain, Ohio, assignor to The Thew Shovel Company, Lorain, Ohio, a corporation of Ohio
Filed Aug. 3, 1959, Ser. No. 831,098
6 Claims. (Cl. 180—9.2)

The present invention relates generally as indicated to a carrier with demountable side frames and more particularly to a mechanized crawler center truck construction in which the crawler side frames may be readily mounted onto, and demounted from, the center truck assembly which provides a turntable for power shovels, cranes, and like equipment.

In equipment of this nature, especially the larger sizes thereof, the lengths and widths of the crawler bases are so great that the equipment cannot be transported from one place to another by rail or by highway. Accordingly, it has been necessary to dismantle such equipment for transport and, hitherto, such dismantling and reassembly operations have been time-consuming and laborious tasks.

It is a principal object of this invention to provide a crawler base assembly in which the crawler side frames each may be removed as a complete assembly within a few minutes time for separate shipment to a place of use and, similarly, each side frame assembly may be easily and quickly reassembled on the center carrier frame to ready the equipment for use.

It is another object of this invention to provide such demountable side frame assemblies that are self-contained unitary assemblies each comprising a side rail carrying the crawler tread and its drive sprockets and chain whereby each assembly is detachable as a unit. All that it is necessary to do when reassembling the side frames to the carrier frame is to bolt them in place and to engage simple jaw clutches or the like, the complementary components of which are respectively mounted on the side frames and on opposite sides of the carrier frame.

It is another object of this invention to provide a center carrier assembly which is provided with side frame supporting shafts that are retractable into pockets formed in the carrier frame so as to minimize the width thereof when the side frames are removed.

It is another object of this invention to provide a universal arrangement in the mounting of the side frames to the center carrier frame in a plurality of positions to provide different overall widths of the carrier assembly.

It is another object of this invention to provide a similar readily demountable center pin structure on the center carrier frame which is so arranged that when the superstructure is removed together with the upper portion of the center pin, the overall height of the carrier frame is decreased by a substantial amount.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a side elevation view showing the carrier assembly with the crawler side frame assemblies mounted in place and also showing the center pin of the carrier assembly disposed in operating position;

FIG. 2 is a top plan view of the carrier assembly, the crawler side frame assembly at the top of FIG. 2 being shown mounted in its innermost position and the crawler side frame assembly at the bottom of FIG. 2 being shown mounted in its outermost position to provide crawler tread center-to-center distances of say, 10′-2″ or 11′-0″ as desired;

FIG. 3 is a fragmentary cross-section view showing the jaw coupling assembly between the top crawler side frame assembly and the carrier frame, such section having been taken along the line 3—3, FIG. 2;

FIG. 4 is a similar cross-section view taken substantially along the line 4—4, FIG. 2 showing the jaw coupling assembly between the carrier frame and the bottom crawler side frame assembly;

FIG. 5 is a cross-section view taken substantially along the line 5—5, FIG. 2 showing one of the retractable pins or shafts of the carrier frame in its protracted operating position for supporting the crawler side frame assembly;

Figure 10:
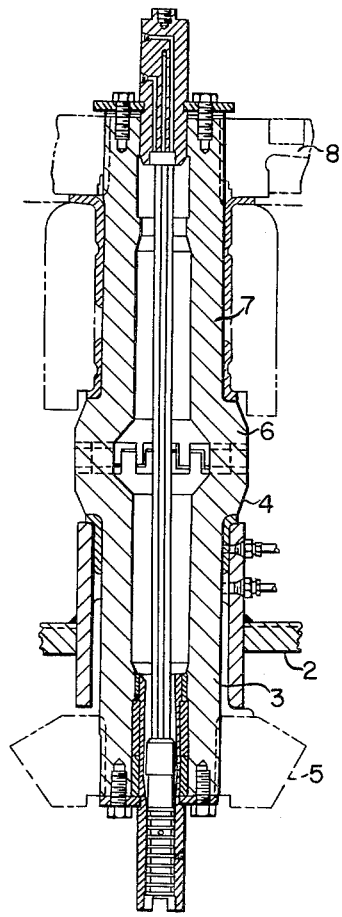
Figure 9:
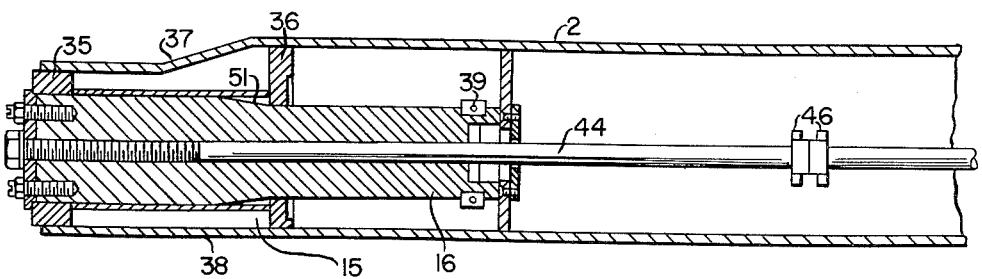

FIGS. 6, 7, and 8 are transverse views taken respectively along the lines 6—6, 7—7, and 8—8 of FIG. 5;

FIG. 9 is a cross-section view similar to FIG. 5 except showing the side frame assembly supporting shaft in its retracted position; and, FIG. 10 is a cross-section view taken substantially along the line 10—10, FIG. 1 showing on enlarged scale the details of the jaw coupling assembly for the center pin of the carrier frame.

Referring now to the drawings in detail, the mechanized crawler carrier 1 herein comprises a center carrier frame 2 provided at the top center thereof with a vertical tubular shaft 3 having a jaw clutch element 4 at its upper end and having a bevel gear 5 keyed thereto at its lower end. Engageable with the jaw clutch element 4 is the jaw clutch element 6 of the upper tubular shaft 7 to which the spur gear 8 is keyed.

Propelling of the crawler carrier 1 is effected in known manner with the drive pinion (not shown) of a gasoline engine, diesel engine or the like in mesh with gear 8 and the bevel gear 5 in mesh with drive gearing (not shown) for propelling the crawler treads 9. Extending through said tubular drive shafts 3 and 7 is a rotary seal assembly which may be of the type generally disclosed in the patent to Roy H. Zeilman, Pat. No. 2,768,843, dated October 30, 1956 through which certain fluid power operations such as power steering for example, are effected by suitable controls in the cab of the superstructure adapted to be mounted on the carrier 1. At opposite sides and at the middle of the length of the carrier frame 2 are crawler drive shafts 10 which may be equipped either with a short jaw coupling member 12, as shown at the top of FIG. 2, or with a long jaw coupling member 14, as shown at the bottom of FIG. 2, said jaw coupling member 12 or 14, having a splined connection as shown in FIGS. 3 and 4 with the respective crawler drive shafts 10 of the carrier frame 2. These crawler drive shafts 10 are adapted to be driven in conventional manner through the aforesaid bevel gear 5 and appropriate steering mechanism whereby the shafts 10 and 11 are driven in the same direction to propel the carrier 1 forwardly or backwardly or driven in opposite directions to turn the carrier 1.

The carrier frame 2 adjacent its ends is formed with two pairs of outwardly opening pockets 15 in which the support shafts 16 for the crawler side frame assemblies 17 are adapted to be mounted, said shafts 16 being reciprocably mounted in the respective pockets 15 so as to decrease the overall width of the carrier 1 from say 14′-0″ to the overall width of the carrier frame, viz, about 10′-4″, when the allo-chiral side frame assemblies 17 are removed and the support shafts 16 therefor are retracted into the respective pockets 15.

Referring now to FIGS. 1 to 9, each crawler side frame assembly 17 comprises a longitudinally extending side rail 18 formed with a pair of openings 19 to receive the respective support shafts 16 on one side of the carrier frame 2. Said rail 18 has journalled adjacent its opposite ends a crawler tread guide 20 and a crawler tread drive sprocket 21. Along the bottom of the side rail 18 are a series of crawler guide rolls 23 which maintain the ground-engaging portion of the crawler tread 9 straight. Along the top of the side rail 18 are guide rollers 24 and a guide rib 25 for the top course of the crawler tread 9. The crawler tread drive sprocket 21 is keyed on a shaft 27 which has keyed thereto a sprocket wheel 28 which is driven by a chain 29 trained thereover and over the sprocket wheel 30 rotatably supported at the middle of the side rail 18. As shown, the hub 31 of the drive sprocket wheel constitutes a jaw coupling element which is engaged with the aforesaid short or long jaw coupling member 12 or 14. The side frames 17 are of identical construction except that one is left hand and the other is right hand.

From the foregoing, it can be seen that the crawler treads 9 may be propelled forwardly or rearwardly, as desired, and, of course, may be driven in opposite directions to facilitate turning of the carrier 1 as a unit when the side frame assemblies 17 are mounted on the carrier frame 2 as shown in FIGS. 1 and 2.

As best shown in FIGS. 5 to 8, each side frame supporting shaft 16 is tubular and is axially slidable in guide collars 35 and 36 welded or otherwise fixed between the top and bottom plates 37 and 38 of the carrier frame 2. A split collar 39 on the inner end of shaft 16 engages collar 36 to determine the outermost operating position. In such operating position, the outer end of shaft 16 projects through a hole 19 of the side rail 18. Another split collar 40 is mounted on the shaft 16 either on the outside of the side rail 18 as shown at the top of FIG. 2 or on the inside of the side rail as shown in the bottom of FIG. 2. In any case, there are screwed into the outer end of each tubular supporting shaft 16 a series of studs 41 which, through the nuts 42 and retainer plate 43, serve to hold the adjacent side rail 18 and split collar 40 on the projecting end of the support shaft 16.

Extending through each support shaft 16 is a screw shaft 44 which has a clamp nut 45 threaded on one end thereof and which has a crosspiece 46 at its other end which fits between lugs 47 of a fixed partition 48 secured across the pocket 15 of the carrier frame 2. Thus, by tightening the nut 45, the retainer plate 43 and support shaft 16 may be urged inwardly to securely clamp the side rail 18 and split collar 40 in place between retainer plate 43 and the outer guide collar 35. The clamp nut 45 is locked against loosening as by locking key 49 which is held on plate 43 by screw 50.

When it is desired to remove the side frame assemblies 17 from the carrier frame 2 all that it is necessary to do (after blocking up the carrier frame 2) is to remove the clamp nuts 45 and retainer plates 43, and to reassemble and turn the clamp nuts 45 to engage the ends of the support shafts 16. This draws the shafts 16 inwardly into the respective pockets 15, as shown in FIG. 9, whereupon, the side frame assemblies 17 may be lifted clear of the center carrier frame 2. The retainer plates 43 may then be reassembled in place using the nuts 42, it being noted that the portions 51 of shafts 16 are wedged in the inner collars 36. The screw shafts 44 may then be shoved in and the clamp nuts 45 locked by keys 49. In that position of the parts the overall width will be, for example, only 10'-4" when the crosspieces 46 are in abutting engagement at the center of the carrier frame 2, whereas, with the side frame assemblies 17 in place, the overall width (outside to outside of the crawler treads 9) may be 13'-2", or 14'-0", depending on whether the split collars 40 are mounted on the outside or on the inside of the respective side rails 18. With the side frame assemblies 17 thus removed, they may be readily transported separately of the carrier frame 2 and can be shipped via existing railroads, whereas, the 13'-2" or 14'-0" carrier 1 could not thus be shipped.

After the carrier frame 2, and the crawler side frame assemblies 17 have been separately transported to the point of use of the equipment, it is an equally simple matter to mount the side frame assemblies 17 on the carrier frame 2 simply by removing the end cap or retainer plate 43 of each shaft 16 and turning the screw shaft 44 so that its crosspiece 46 passes through the slot 56 of the partition 48 and engages in a slot 57 formed in the inner end of the support shaft 16. The end of the support shaft 16 may be positioned to project slightly beyond the outer guide collar 35, whereupon the side frame assembly 17 may be positioned thereover, or the split clamp as desired. Then, by placing the end cap 43 on the screw 44, and turning the nut 45, the screw shaft 44, together with the support shaft 16, are forced outwardly from their respective pockets 15 to extend through the holes 19 of the side rails 18. Finally, the holes of the end cap 43 are aligned with the studs 41 and the nuts 42 are screwed onto the studs. Thereafter, the clamp nut 45 may be removed and the screw shaft 44 pushed inwardly with the crosspiece 46 passing through the slot 56 of the partition 48 and beyond the lugs 47, whereupon said screw 44 may be turned so that the crosspiece 46 engages between the lugs 47 and is thereby held against rotation. The nut 45 is then tightened and the locking key 49 assembled in place.

It is to be noted that in so assembling the side frame assemblies 17 it is a simple matter to align the jaw coupling members 12 (or 14) and 31.

As previously mentioned, the split collars 40 may be assembled either on the outside of the side rails 18 in which case the short jaw coupling members 12 are used or on the inside of the side rails 18 in which case the long coupling members 14 are used.

With reference to FIG. 10, this center pin structure has already been described in detail and as evident this feature enables considerable decrease in the height of the carrier frame 2 which may be necessary in some instances, as where the clearance of bridges or tunnels is relatively low.

Other modes of applying the principle of the invention may be employed, change being made as regards the details described, provided the features stated in any of the following claims, or the equivalent of such, be employed.

I therefore particularly point out and distinctly claim as my invention:

1. In a crawler carrier for cranes, power shovels, and like equipment, the combination of a center frame formed with pockets on opposite sides; shafts axially reciprocably mounted in such pockets from retracted to protracted position; crawler side frames detachably secured to opposite sides of said center frame; said side frames being formed with holes to receive the ends of said shafts when the latter are in protracted position only, and screws extending through the respective shafts, said screws having non-rotatably and axially outwardly fixed engagement with said center frame whereby nut means on the outer ends of said screws may be employed to clamp said side frames against the opposite sides of said center frame.

2. In a crawler carrier for cranes, power shovels, and like equipment, the combination of a center frame formed with pockets on opposite sides; shafts axially reciprocably mounted in such pockets from retracted to protracted position; crawler side frames detachably secured to opposite sides of said center frame; said side frames being formed with holes to receive the ends of said shafts when the latter are in protracted position only, and screws extending through the respective shafts, said screws having non-rotatable engagement with said shafts whereby nut means on the outer ends of said screws bearing on said side frames may be employed to protract said shafts into holes of said side frames.

3. In a crawler carrier for cranes, power shovels, and like equipment, the combination of a center frame formed with pockets on opposite sides; shafts axially reciprocably mounted in such pockets from retracted to protracted position; crawler side frames detachably secured to opposite sides of said center frame; said side frames being formed with holes to receive the ends of said shafts when the latter are in protracted position only, screws extending through the respective shafts, first retainer means for said screws operative to retain said screws against rotation and axial outward movement whereby nut means on the outer ends of said screws may be employed to clamp said side frames against the opposite sides of said center frame, and second retainer means for said screws whereby said screws are non-rotatably engaged with said shafts to move axially outward in unison whereby nut means on the outer ends of said screws bearing on said side frames may be employed to protract said shafts into the holes of said side frames.

4. In a crawler carrier for cranes, power shovels, and like equipment, the combination of a center frame formed with pockets on opposite sides; shafts axially reciprocably mounted in such pockets from retracted to protracted position; crawler side frames detachably secured to opposite sides of said center frame; said side frames being formed with holes to receive the ends of said shafts when the latter are in protracted position only, and screws extending through the respective shafts, said screws having a first position whereat they are retained against rotation and axially outward movement, a second position whereat they are engaged with said shafts to protract the same axially from their pockets, and a third position whereat they and said shafts are in axially retracted position.

5. In a crawler carrier for cranes, power shovels, and like equipment, the combination of a center frame, crawler side frames detachably connected to opposite sides of said center frame; a detachable connection on each side of said center frame comprising telescoped shafts and shaft receiving holes in said side frames, said shafts being mounted for axial retraction into pockets in said center frame out of telescoped relation with said holes, and screws extending through said shafts operative axially to retract said shafts out of telescoped relation with said holes.

6. In a crawler carrier for cranes, power shovels, and like equipment, the combination of a center frame having drive means on opposite sides; and crawler side frames detachably connected to opposite sides of said center frame, said side frames being provided with crawler treads and sprocket chain drives therefor, the latter being coupled to the respective drive means as the consequence of the connection of said side frames to said center frame, said sprocket chain drives including drive sprocket wheels for the respective side frames, said drive sprocket wheels constituting jaw coupling elements, telescoping shafts mounted in pockets in said center frame and shaft receiving holes in said side frames, and means operative axially to extend and retract said shafts into and out of telescoped relation with said holes whereby said crawler side frames are detachably connected to opposite sides of said center frame.

References Cited in the file of this patent

UNITED STATES PATENTS

| | | |
|---|---|---|
| 1,875,052 | Ljungkull | Aug. 30, 1932 |
| 2,035,858 | Bauer et al. | Mar. 31, 1936 |
| 2,681,231 | Kondracki | June 15, 1954 |
| 2,763,330 | Potter | Sept. 18, 1956 |